US010899847B2

(12) United States Patent
Nonni et al.

(10) Patent No.: US 10,899,847 B2
(45) Date of Patent: Jan. 26, 2021

(54) OPEN CHAIN MODIFIED CELLULOSIC PULPS AND METHODS OF MAKING AND USING THE SAME

(71) Applicant: GP Cellulose GmbH, Zug (CH)

(72) Inventors: Arthur J. Nonni, Peachtree City, GA (US); James M. Keough, Atlanta, GA (US); Charles E. Courchene, Snellville, GA (US); Harry R. Bartges, Collierville, TN (US); Blair R. Carter, Marietta, GA (US)

(73) Assignee: GP Cellulose GMBH, Zug (CH)

( * ) Notice: Subject to any disclaimer, the term of this patent is extended or adjusted under 35 U.S.C. 154(b) by 222 days.

(21) Appl. No.: 15/780,324

(22) PCT Filed: Nov. 30, 2016

(86) PCT No.: PCT/US2016/064053
§ 371 (c)(1),
(2) Date: May 31, 2018

(87) PCT Pub. No.: WO2017/095831
PCT Pub. Date: Jun. 8, 2017

(65) Prior Publication Data
US 2019/0382509 A1 Dec. 19, 2019

Related U.S. Application Data

(60) Provisional application No. 62/261,541, filed on Dec. 1, 2015.

(51) Int. Cl.
| | |
|---|---|
| *C08B 15/04* | (2006.01) |
| *C08B 3/00* | (2006.01) |
| *C08B 9/00* | (2006.01) |
| *C08B 11/00* | (2006.01) |
| *C08B 15/00* | (2006.01) |

(52) U.S. Cl.
CPC .............. *C08B 15/04* (2013.01); *C08B 3/00* (2013.01); *C08B 9/00* (2013.01); *C08B 11/00* (2013.01); *C08B 15/00* (2013.01)

(58) Field of Classification Search
None
See application file for complete search history.

(56) References Cited

U.S. PATENT DOCUMENTS

| 3,017,316 A | 1/1962 | Rapson |
| 8,778,136 B2 | 7/2014 | Nonni et al. |
| 9,511,167 B2 | 12/2016 | Nonni et al. |
| 9,512,237 B2 | 12/2016 | Nonni et al. |
| 9,512,561 B2 | 12/2016 | Nonni et al. |
| 9,512,562 B2 | 12/2016 | Nonni et al. |
| 9,512,563 B2 | 12/2016 | Nonni et al. |
| 9,777,432 B2 | 10/2017 | Nonni et al. |
| 9,909,257 B2 | 3/2018 | Nonni et al. |
| 9,926,666 B2 | 3/2018 | Nonni et al. |
| 9,970,158 B2 | 5/2018 | Nonni et al. |
| 2010/0288456 A1* | 11/2010 | Westland .............. D21H 17/33 162/57 |
| 2014/0274680 A1 | 9/2014 | Nonni et al. |
| 2014/0284008 A1 | 9/2014 | Nonni et al. |

FOREIGN PATENT DOCUMENTS

| EP | 1505197 A1 | 2/2005 |
| JP | 2013104133 A | 5/2013 |
| JP | 2013213213 A | 10/2013 |
| JP | 2013249448 A | 12/2013 |
| WO | WO 01/29309 A1 | 4/2001 |
| WO | WO 2010/138941 A1 | 2/2010 |
| WO | WO 2013/106703 A1 | 7/2013 |
| WO | WO 2013/158384 A1 | 10/2013 |
| WO | WO 2014/122533 A2 | 8/2014 |
| WO | WO 2014/140852 A2 | 9/2014 |
| WO | WO 2014/140940 A2 | 9/2014 |
| WO | WO 2015/138335 A1 | 9/2015 |
| WO | WO 2017/066499 A1 | 4/2017 |
| WO | WO 2017/210079 A1 | 12/2017 |

OTHER PUBLICATIONS

Casu, Macromolecules 1985, 18, 2762-2767. (Year: 1985).*
International Search Report dated Oct. 3, 2017 in PCT/US2016/064053.
Cumpstey: "Chemical Modification of Polysaccharides", ISRN Organic Chemistry, vol. 2013, Jan. 1, 2013 (Jan. 1, 2013), pp. 1-27.
Dash et al.: "Grafting of model primary amine compounds to cellulose nanowhiskers through periodate oxidation", Cellulose, Kluwer Academic Publishers (Dordrecht), NL, vol. 19, No. 6, Aug. 31, 2012 (Aug. 31, 2012), pp. 2069-2079.
Larsson et al.: "Ductile All-Cellulose Nanocomposite Films Fabricated from Core-Shell Structured Cellulose Nanofibrils", Biomacromolecules, vol. 15, No. 6, Apr. 28, 2014 (Apr. 28, 2014), pp. 2218-2223.
Liimatainen H. et al.: "Characterization of highly accessible cellulose microfibers generated by wet stirred media milling", Carbohydrate Polymers, Applied Science Publishers, Ltd. Barking, GB, vol. 83, No. 4, Feb. 1, 2011 (Feb. 1, 2011), pp. 2005-2010.
Rinaudo: "Periodate Oxidation of Methylcellulose: Characterization and Properties of Oxidized Derivatives", Polymers, vol . 2, No. 4, Oct. 29, 2010 (Oct. 29, 2010), pp. 505-521.

(Continued)

*Primary Examiner* — Layla D Berry

(57) ABSTRACT

The present disclosure generally relates to open chain modified cellulosic pulps and methods for making and using the same. More specifically, the open chain modified cellulosic pulps described herein may be made by oxidation of a cellulosic pulp, followed by reduction of the oxidized groups, resulting in a modified pulp having an improved open chain configuration that may be more efficiently converted into cellulosic derivative products. This disclosure further relates to improved cellulosic derivative products made therefrom, for example, cellulose esters, cellulose ethers, and regenerated cellulose products.

17 Claims, 10 Drawing Sheets

(56) References Cited

OTHER PUBLICATIONS

Sirvio J. et al.: "Periodate oxidation of cellulose at elevated temperatures using metal salts as cellulose activators", Carbohydrate Polymers, Applied Science Publishers, Ltd. Barking, GB, vol . 83, No. 3, Jan. 30, 2011 (Jan. 30, 2011), pp. 1293-1297.
Varma A. J. et al.: "Oxidation of cellulose under controlled conditions", Polymer Degradation and Stability, Barking, GB, vol . 77, No. 1, Jan. 1, 2002 (Jan. 1, 2002).
Achwal et al., "Viscosity Measurements on Chemically Modified Celluloses," I&EC Product Research and Development, vol. 6, No. 4 (Dec. 1967); pp. 278-281.
Burgess, "Relationships Between Colour Production in Cellulose and the Chemical Changes Brought About by Bleaching," Transcript of a Lecture given at the Meeting of the Book and Paper Specialty Group, AIC Annual Meeting, Milwaukee, May 27-30, 1982 (http://cool.conversation-us.org/coolaic/sg/bpg/annual /v01/bp01-05.html).
Calvini et al., "Viscometric determination of a dialdehyde content in periodate oxycellulose. Part I. Methodology," Cellulose, vol. 11 (2004), pp. 99-107.
Chirat et al., "Use of a reducing stage to avoid degradation of softwood kraft pulp after ozone bleaching," Paper and Timber, 76 (1994), pp. 417-422.
Meller, "Studies on modified cellulose. IV. Oxidation by chlorous acid and reduction by sodium borohydride of chemically modified celluloses," TAPPI, vol. 38 (1955), pp. 682-687.
JP Notice of Reason for Rejection for JP application No. 2018-528009, dated Aug. 6, 2020, 13 pages.

* cited by examiner

OPEN CHAIN MODIFIED CELLULOSIC PULPS AND METHODS OF MAKING AND USING THE SAME

TECHNICAL FIELD

The present disclosure generally relates to novel cellulosic pulps that have been modified to open glucose rings on the polymer chains of the cellulosic pulp, increasing accessibility of functional groups on the cellulosic pulp to chemical derivatization. The open chain modified cellulose of the present disclosure may be used in the manufacture of cellulosic derivative products, such as cellulose esters, cellulose ethers, and regenerated cellulose products.

BACKGROUND

Cellulosic pulps may be prepared by chemically or mechanically separating cellulose fibers from plant-based materials, such as wood or cotton. When derived from wood, cellulosic pulps are composed of three primary components: cellulose, hemicellulose, and lignin. Cellulose is a straight-chain, unbranched polymer composed of repeating β-D-1, 4-anhydroglucose monomers, as shown in Structure 1 below.

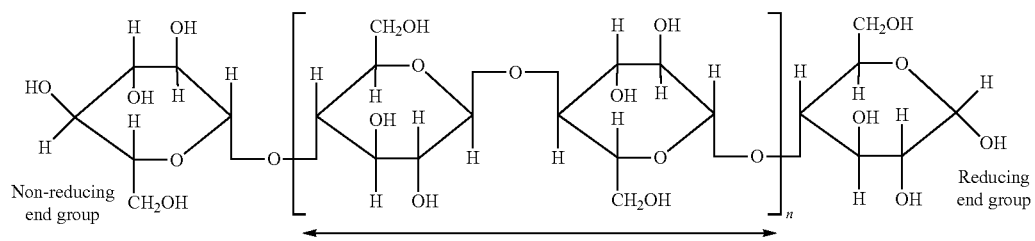

Structure 1

The carbon atoms of the anhydroglucose monomers that make up cellulose chains have customarily been labeled C1 through C6 as shown in Structure 2 below, with adjacent anhydroglucose monomers connected by linkages between the C1 carbon of one glucose monomer to the C4 carbon of the next.

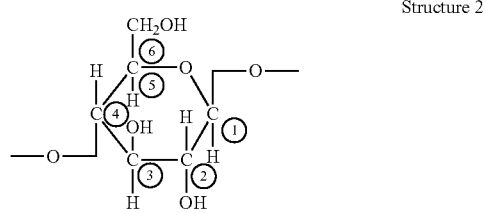

Structure 2

Cellulosic derivative products, such as cellulose esters, cellulose ethers, and regenerated cellulose products, are products derived from processes that subject cellulose to chemical reactions that replace functional groups on the anhydroglucose monomers, such as hydroxyl groups, with substituents other than hydroxyl groups. Traditionally, such cellulosic derivative products have been made from wood or cotton-based high alpha cellulosic pulps having low or appreciable no levels of hemicellulose and lignin.

One of the limiting factors in the conversion of cellulosic pulps into cellulosic derivative products is the accessibility of chemicals to the functional groups of the cellulose chains, such as hydroxyl groups, which limited accessibility may reduce reactivity and/or overall conversion efficacy of the reaction. This limited accessibility is due, at least in part, to the highly crystalline structured nature of cellulose fibers caused by bonding associated with the secondary hydroxyl groups on the C2 and C3 carbons of the β-D-1,4-anhydroglucose monomers. For example, the hydroxyl group of a C2 carbon may form a hydrogen bond with the hydroxyl group of an adjacent cellulose chain, or the hydroxyl group of a C3 carbon may form a bond with the endocyclic oxygen located in between the C1 and C5 carbon of an adjacent chain. This bonding creates a stiff, highly crystalline structure among the individual chains of a cellulosic pulp. The hydroxyl groups contained within the crystalline structure of the cellulosic pulp are difficult to access for chemicals used in the conversion of cellulosic pulps into derivative products, such as cellulose ethers and regenerated cellulose products, and especially for acid catalyzed products such as cellulose esters. This limited accessibility has been found to be particularly troublesome in softwood pulps, which typically exhibit higher crystallinity than hardwood pulps.

In view of the shortcomings and problems associated with traditional methods for preparing cellulosic derivative products from cellulosic pulps, a cellulosic pulp with improved accessibility to functional groups, such as hydroxyl groups, is desired.

SUMMARY OF THE INVENTION

The present invention provides novel open chain modified cellulosic pulps having increased levels of primary alcohol groups. Such open chain modified cellulosic pulps exhibit improved accessibility to functional groups located on the cellulose anhydroglucose monomers, such as hydroxyl groups, leading to increased reactivity and/or conversion efficacy when used as starting materials in processes for preparing cellulosic derivative products. It is further believed that the open chain modified cellulosic pulp described herein may exhibit improved dissolution, as is often used in the manufacture of such derivative products. The novel open chain modified cellulosic pulps described herein may be used in place of more expensive high alpha cellulosic pulps traditionally used for such applications. The present invention further provides for cellulosic derivative products made from such novel open chain modified cellulosic pulps, such as cellulose esters, cellulose ethers, regenerated celluloses, and other specialty products.

The present invention further provides methods for making novel open chain modified cellulosic pulps having increased levels of primary alcohol groups. In accordance with the methods described herein, the crystalline structure of a cellulosic pulp may be reduced by, first, oxidizing the secondary alcohol groups located on cellulose anhydroglucose monomers to create an oxidized pulp comprising aldehyde and/or carboxylic structures at the C2 and C3 carbons, followed by, second, subjecting the oxidized pulp to a reduction reaction to convert the aldehyde and/or carboxyl groups on the oxidized cellulose into primary alcohols.

This ultimate transformation of secondary alcohols to primary alcohols is believed to provide an open chain modified cellulosic pulp with greater accessibility of its functional groups to further chemical derivatization as compared to traditional cellulosic pulps. Without being bound by theory, it is believed that this greater accessibility of the functional groups located on the novel open chain modified cellulosic pulps described herein, and particularly the newly created primary alcohol groups, increases at least one of dissolution, reactivity, derivatization rate, and/or level of substitution in further chemical derivatization processes, such as in esterification, etherification, or xanthation/regeneration processes. This increased dissolution, reactivity, derivatization rate, and/or level of substitution may allow practitioners to derivatize the novel open chain modified cellulosic pulps described herein with longer chain and/or more highly substituted or branched substituents over traditional cellulosic pulps.

Additional objects and advantages of the present disclosure will be set forth in part in the description which follows. The objects and advantages of the present disclosure will further be realized and attained by means of the elements and combinations particularly pointed out in the appended claims.

DETAILED DESCRIPTION OF THE INVENTION

Figure 1:
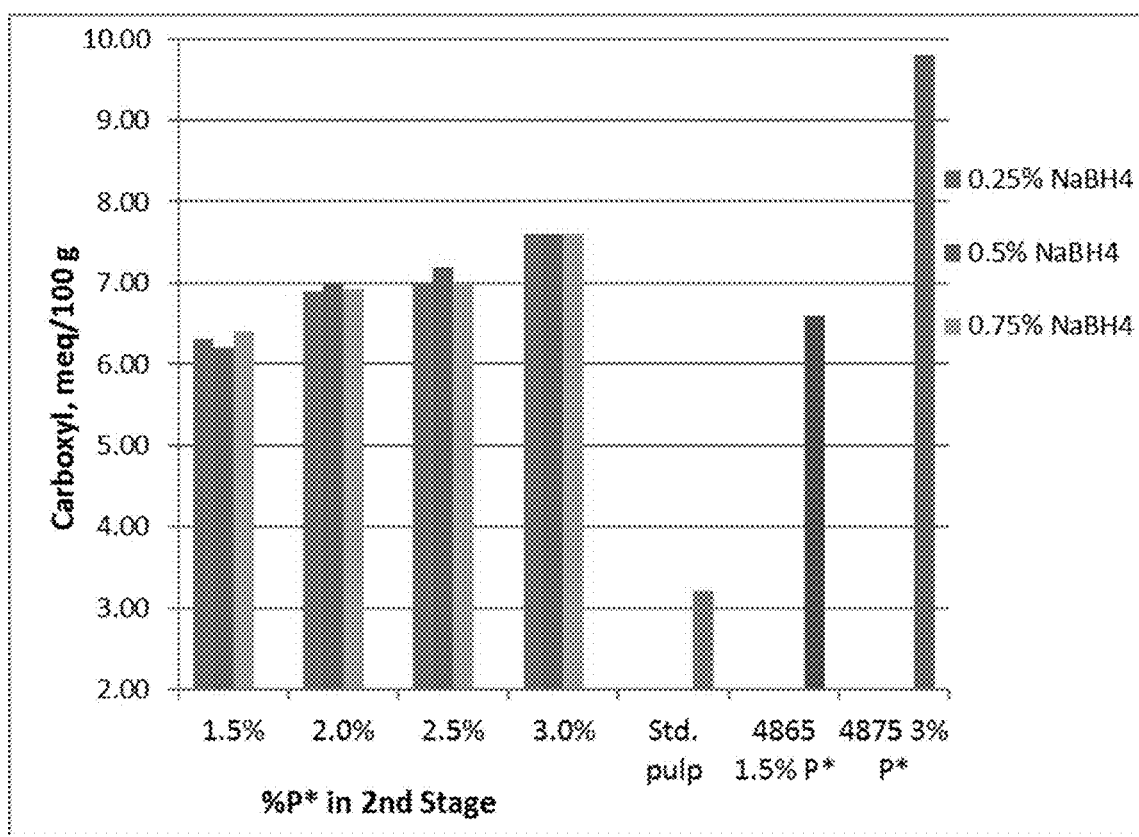
FIG. 1 shows the carboxyl content results from Example 1.

The present invention discloses open chain modified cellulosic pulps, methods of making open chain modified cellulosic pulps, and cellulosic derivative products made from such open chain modified cellulosic pulps. As used herein, the term "open chain modified cellulosic pulp" refers to a cellulosic pulp having increased levels of primary alcohol groups at the C2 and C3 carbons located on the cellulose anhydroglucose monomers over cellulosic pulps that have not been subjected to the oxidation and reduction steps detailed herein. As used herein, the term "primary alcohol" means an alcohol wherein the carbon that carries the hydroxyl (—OH) group is attached to only one other carbon. As used herein, the term "secondary alcohol" means an alcohol wherein the carbon that carries the hydroxyl (—OH) group is attached to two other carbons.

The open chain modified cellulosic pulp described herein may be derived from any common cellulosic material, including wood or cotton. The cellulosic pulp may be derived from softwood fiber, hardwood fiber, or mixtures thereof. In some embodiments, the cellulosic pulp may be derived from softwood, such as southern pine. In some embodiments, the cellulosic pulp may be derived from hardwood, such as eucalyptus.

The cellulosic pulp may be derived from any common pulping process, including chemical, mechanical, and semi-mechanical. In some embodiments, the cellulosic pulp may be derived from a chemical pulping process, for example a Kraft, sulfite, or sulfate pulps. In some embodiments, the cellulosic pulp may be a Kraft pulp. In some embodiments, the cellulosic pulp may be Kraft softwood southern pine.

In some processes, particularly those used to create high-alpha cellulose products, the cellulosic material may undergo prehydrolysis prior to pulping in order to reduce hemicellulose content. Prehydrolysis can be performed by any method known to those of ordinary skill in the art. For instance, the prehydrolysis may be an acid prehydrolysis. In some embodiments, the cellulosic pulp may be subjected to prehydrolysis. In some embodiments, the cellulosic pulp may be subjected to both prehydrolysis and Kraft pulping.

In some processes, the cellulosic pulp may also undergo an oxygen delignification process between Kraft pulping and the start of bleaching. This delignification process generally further reduces the lignin content and improves the effectiveness of the subsequent bleaching sequence. Oxygen delignification can be performed by any method known to those of ordinary skill in the art. For instance, oxygen delignification may be a conventional two-stage oxygen delignification. In some embodiments, the cellulosic pulp is further subject to oxygen delignification after pulping.

Following pulping and/or oxygen delignification, cellulosic pulps are commonly bleached, often in multi-stage sequences that traditionally comprise strongly acidic and strongly alkaline bleaching stages. Bleaching of wood pulp is generally conducted with the aim of selectively increasing the whiteness and/or brightness of the pulp, typically by removing lignin and other impurities, without negatively affecting physical properties. Bleaching of chemical pulps, such as Kraft pulps, generally requires several different bleaching stages to achieve a desired whiteness and/or brightness with good selectivity. Typically, a bleaching sequence employs stages conducted at alternating pH ranges. This alternation is believed to aid in the removal of impurities generated in the bleaching sequence, for example, by solubilizing the products of lignin breakdown. In some embodiments, the cellulosic pulp may be derived from a process comprising acid prehydrolysis, followed by Kraft pulping, followed by bleaching.

In some embodiments, the bleaching process may include a multi-stage bleaching sequence. In some embodiments, the bleaching sequence may include a cold caustic stage. In some embodiments the bleaching sequence may include an acid sour wash stage. In some embodiments, the bleaching sequence may include both a cold caustic stage and an acid sour wash stage. In some embodiments, the bleaching sequence may include any additional stage or series of stages conducted under conventional conditions. In some embodiments, the bleaching sequence may comprise one or more of a D, P, E, Eo, and Eop stages.

Oxidation Treatment

In accordance with the methods described herein, the cellulosic pulp is oxidized to form an oxidized cellulosic pulp. In cellulose oxidation, hydroxyl groups of the glycosides of the cellulose chains can be converted, for example, to carbonyl groups, such as aldehyde and ketone groups, as well as carboxylic acid groups. Various methods of oxidizing cellulose are known. Depending on the oxidation method and conditions used, the type, degree, and location of the modifications may vary. According to the present invention, the method of oxidation may be any method of cellulose oxidation that creates aldehyde and/or carboxylic structures at the C2 and C3 carbons of anhydroglucose monomers. Examples of anhydroglucose monomers carrying dialdehyde and dicarboxylic structures at the C2 and C3 carbons are shown in Structure 3 and Structure 4 below, respectively.

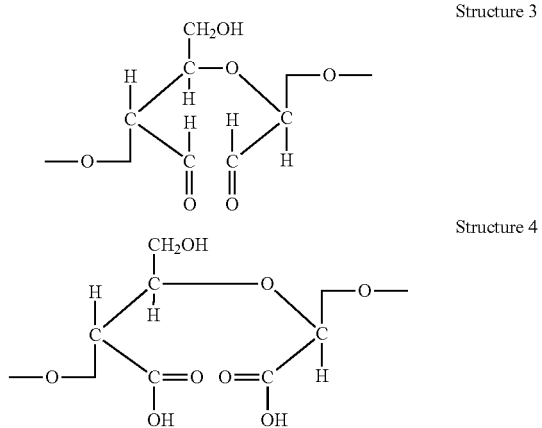

Structure 3

Structure 4

As seen in Structure 3 and Structure 4, the creation of dialdehyde and dicarboxylic structures effectively breaks the bond between the C2 and C3 carbons, opening up the oxidized cellulose anhydroglucose monomer ring. The effect of the oxidation described herein is not limited to only the formation of dialdehyde and dicarboxylic structures at the C2 and C3 carbons, but may include combinations of aldehyde, carboxylic acid, and ketone groups at the C2 and C3 carbons, as well as modifications at additional carbons, including the C6 carbon. In some embodiments, a majority of the C2 and C3 carbons of the cellulosic pulp prior to oxidation are secondary alcohols. In some embodiments, the oxidation process converts a plurality of the secondary alcohols at the C2 and C3 carbons to aldehyde and/or carboxyl functional groups. In some embodiments, the oxidation process converts a majority of the secondary alcohols at the C2 and C3 carbons to aldehyde and/or carboxyl functional groups.

The oxidation of the cellulosic pulp may also affect other components of the pulp. In some embodiments where the cellulosic pulp contains hemicelluloses (for example xylose, mannose, galactose, rhamnose, and/or arabinose), the hemicelluloses may also be modified by the oxidation process to impart aldehyde, ketone, and/or carboxylic acid structures to the hemicelluloses. In some embodiments, aldehyde and/or carboxylic acids may be imparted to the hemicelluloses, which may also open up those hemicellulose monomers by breaking bonds between adjacent carbons in the monomer rings. In some embodiments, the method of oxidation opens rings in the monomers of both the cellulose and the hemicellulose components of the cellulosic pulp.

In some embodiments, the oxidation of the cellulosic pulp may comprise treating the cellulosic pulp with periodate. In some embodiments, the oxidation of the cellulosic pulp may comprise treating the cellulosic pulp with nitrogen dioxide. In some embodiments, the oxidation of the cellulosic pulp may comprise treating the cellulosic pulp with at least a catalytic amount of a metal catalyst and a peroxide.

In some embodiments, the oxidation method may comprises oxidizing the cellulosic material with iron and hydrogen peroxide. The source of iron can be any suitable source, as a person of skill would recognize, such as for example ferrous sulfate (for example ferrous sulfate heptahydrate), ferrous chloride, ferrous ammonium sulfate, ferric chloride, ferric ammonium sulfate, or ferric ammonium citrate. In some embodiments, the method comprises oxidizing the cellulosic material with copper and hydrogen peroxide. Similarly, the source of copper can be any suitable source as a person of skill would recognize. In some embodiments, the method comprises oxidizing the cellulosic material with a combination of copper and iron and hydrogen peroxide.

The oxidation method may be conducted at any pH known to be useful for the oxidation reaction. In some embodiments, the method comprises oxidizing the cellulosic material at an acidic pH. In some embodiments, the method comprises providing the cellulosic material, acidifying the cellulosic material, and then oxidizing the cellulosic material at acidic pH. In some embodiments, the pH ranges from about 2 to about 6, for example from about 2 to about 5, or from about 2 to about 4.

In some embodiments, the cellulosic material is not subjected to alkaline conditions during or after oxidation. Without being bound by theory, it is believed that subjecting cellulose that has been oxidized to include aldehyde groups at the C2 and C3 carbons may undergo severe degradation if subjected to alkaline conditions. In some embodiments, the cellulosic material is subjected to alkaline conditions after oxidation in order to reduce the degree of polymerization of the cellulosic material. In some embodiments, the cellulosic material may be subjected to alkaline conditions only after the oxidized cellulose has further been subjected to a reduction reaction. Without being bound by theory, it is believed that oxidized cellulose that has further been subjected to a reduction reaction prior to being subjected to alkaline conditions experiences less degradation due to the reduction of the alkali-sensitive aldehyde groups to hydroxyl groups.

In some embodiments, the method of oxidizing the cellulosic material may involve acidifying a Kraft pulp to a pH ranging from about 2 to about 5 (using for example sulfuric acid), mixing a source of iron (for example ferrous sulfate, for example ferrous sulfate heptahydrate) with the acidified Kraft pulp at an application of from about 15 to about 300 ppm $Fe^{+2}$ based on the dry weight of the Kraft pulp (for example from about 25 to about 150 ppm) at a consistency ranging from about 1% to about 15% (for example from about from about 3.5% to about 12%) and also hydrogen peroxide in an amount ranging from about 0.01% to about 2.0% based on the dry weight of the Kraft pulp (for example from about 0.05% to about 0.5%). In some embodiments the acidic Kraft pulp is mixed with the iron source and reacted with the hydrogen peroxide for a time period ranging from about 40 to about 240 minutes (for example from about 60 to about 90 minutes) at a temperature ranging from about 60 to about 80° C. (for example about 70° C.).

In some embodiments, wherein the oxidation is carried out with a catalytic amount of a metal catalyst, for example an iron or copper catalyst, and a peroxide, such as hydrogen peroxide, there may be an acidic step, such as an acidic bleaching stage, following oxidation, which step has surprisingly been found to remove much of the residual metal catalyst. In some embodiments, where an acidic step follows the catalytic oxidation step, the resultant oxidized cellulose has a residual metal catalyst content of less than 10 ppm each, for example less than 5 ppm.

The oxidation of the cellulosic material may occur at any point during production of the cellulosic material, including before or after prehydrolysis, before or after Kraft pulping, before or after oxygen delignification, before or after bleaching, or during one or more stages of a bleaching process. In some embodiments, the method comprises oxidizing the cellulosic material in one or more stages of a multi-stage bleaching sequence. In some embodiments, at least one acidic bleaching stage follows the oxidation stage. In some embodiments, where the multi-stage bleaching sequence comprises a cold caustic extraction stage, the oxidation may take place in a bleaching stage preceding the cold caustic extraction stage. In some embodiments, where the multi-stage bleaching sequence comprises a cold caustic extraction stage, the oxidation may take place in a bleaching stage following the cold caustic extraction stage. In some embodiments, the cellulosic material may be further oxidized in one or more additional oxidation stages preceding or following the bleaching sequence. In some embodiments, where the multi-stage bleaching sequence comprises a cold caustic extraction stage, the oxidation may take place in a bleaching stage before the cold caustic extraction stage and in a bleaching stage following the cold caustic extraction stage.

Methods for oxidizing a cellulosic pulp that may be used in the instant invention include those disclosed in published International Applications Nos. WO/2010/138941, WO/2012/170183, and WO/2013/106703, which are incorporated herein by reference.

In some embodiments, the cellulosic pulp following oxidation may have a viscosity ranging from about 3 mPa·s to about 12 mPa·s, for example from about 4 mPa·s to about 10 mPa·s, from about 5 mPa·s to about 9 mPa·s, or from about 6 mPa·s to about 8 mPa·s. Viscosity may be measured according to TAPPI T230-om99. In some embodiments, the viscosity of the cellulosic pulp following oxidation may be less than 12 mPa·s, less than 10 mPa·s, less than 8 mPa·s, less than 6 mPa·s, or less than 5 mPa·s.

In some embodiments, the oxidation process may increase the carboxyl content of the cellulosic pulp by at least 0.5 meq/100 g, for example by at least 1 meq/100 g, by at least 1.5 meq/100 g, by at least 2.5 meq/100 g, or by at least 5 meq/100 g. Carboxyl content may be measured according to TAPPI T237-cm98. In some embodiments, the cellulosic pulp following oxidation may have a carboxyl content of at least about 2 meq/100 g, for example, at least about 3 meq/100 g, at least about 5 meq/100 g, at least about 7 meq/100 g, or at least about 9 meq/100 g. In some embodiments, the carboxyl content of the oxidized cellulose may range from about 1 meq/100 g to about 10 meq/100 g, for example from about 3 meq/100 g to about 6 meq/100 g.

In some embodiments, the oxidation process may increase the aldehyde content of the cellulosic pulp by at least 1 meq/100 g, for example by at least 2 meq/100 g, by at least 4 meq/100 g, by at least 6 meq/100 g, or by at least 8 meq/100 g. Aldehyde content may be measured according to Econotech Services LTD procedure ESM 055B. In some embodiments, the cellulosic pulp following oxidation may have an aldehyde content of at least about 2 meq/100 g, at least about 4 meq/100 g, at least about 6 meq/100 g, at least about 8 meq/100 g, or at least about 12 meq/100 g. In some embodiments, the aldehyde content of the oxidized pulp may range from about 1 meq/100 g to about 15 meq/100 g, for example, from about 2 to about 12 meq/100 g, or from about 3 to about 7 meq/100 g.

In some embodiments, the cellulosic pulp following oxidation may have a ratio of carbonyl content to carboxyl content from about 5:1 to 1:5, for example from about 3:1 to about 1:3, from about 2:1 to 1:1, or from about 1.5:1 to 1:1.

In some embodiments, the cellulosic pulp following oxidation may have a copper number ranging from about 0.1 to about 10. Copper Number may be measured according to TAPPI T430-cm99 and is believed to be related to the level of carbonyl content. In some embodiments, the copper number of the oxidized pulp may be greater than 1, greater than 2, greater than 3, greater than 4, or greater than 5.

In some embodiments, the oxidation process may increase the carbonyl content of the cellulosic pulp by at least 1 meq/100 g, for example at least 2 meq/100 g, by at least 4 meq/100 g, by at least 6 meq/100 g, or by at least 8 meq/100 g. Carbonyl content may be calculated from Copper Number according to the formula: carbonyl=(Cu. No.−0.07)/0.6, from *Biomacromolecules* 2002, 3, 969-975. In some embodiments, the cellulosic pulp following oxidation may have a carbonyl content of at least about 2 meq/100 g, at least about 4 meq/100 g, at least about 6 meq/100 g, at least about 8 meq/100 g, or at least about 12 meq/100 g. In some embodiments, the carbonyl content of the oxidized pulp may range from about 1 meq/100 g to about 16 meq/100 g, for example, from about 2 to about 12 meq/100 g, or from about 3 to about 7 meq/100 g.

Reduction Treatment

In accordance with the methods described herein, the oxidized cellulose may subsequently be subjected to a reduction reaction in order to form an open chain modified cellulosic pulp. Various methods of reduction reactions are known. In accordance with the present invention, a "reduction reaction" is any reaction that converts aldehyde and/or carboxylic acid groups on the anhydroglucose monomers to hydroxyl groups, including those at the C2 and C3 carbons. As shown in Structure 5 below, where aldehyde and/or carboxylic acid groups imparted by the prior oxidation step at the C2 and C3 carbons are reduced to hydroxyl groups, the resulting cellulosic pulp may exhibit primary alcohol groups at the C2 and C3 carbons, where secondary alcohol groups existed in the anhydroglucose monomers prior to oxidation and reduction.

Structure 5

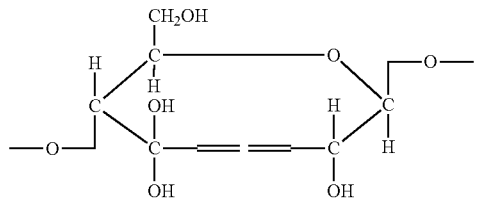

As seen in Structure 5 above, this results in an open chain modified cellulosic pulp. The effect of the reduction reaction described herein is not limited to reduction of aldehyde and carboxylic acid groups at the C2 and C3 carbons, but may include additional reduction of aldehyde, ketone, and/or carboxylic acid functional groups existing in the oxidized cellulose at other carbons as well, including at the C6 carbon and the C1 reducing end group. In some embodiments, a plurality of the aldehyde groups at the C2 and C3 carbons of the oxidized cellulosic pulp are reduced to hydroxyl groups by the reduction reaction. In some embodiments, a majority of the aldehyde groups at the C2 and C3 carbons of the oxidized cellulosic pulp are reduced to hydroxyl groups by the reduction reaction. In some embodiments, substantially all of the aldehyde groups at the C2 and C3 carbons of the oxidized cellulosic pulp are reduced to hydroxyl groups by the reduction reaction.

In some embodiments where the cellulosic pulp contains hemicelluloses, the reduction reaction may also include reduction of aldehyde, ketone, and/or carboxylic acid groups existing in the hemicellulose components, including those imparted by the prior oxidation step. In some embodiments, where dialdehyde and/or dicarboxylic acids have been imparted to the hemicelluloses by the prior oxidation step, the reduction reaction may also result in an open chain structure on the hemicelluloses, including the presence of primary alcohol groups on the hemicelluloses where secondary alcohol groups existed prior to oxidation and reduction.

Any reducing agent that converts aldehyde and/or carboxylic acid groups on the anhydroglucose monomers to hydroxyl groups, including those at the C2 and C3 carbons, may be used in the reduction reaction. For example, the reducing agent may be selected from one or more of lithium tetrahydridoaluminate(III) (also known as lithium aluminum hydride), sodium tetrahydridoborate(III) (also known as sodium borohydride), sodium cyanoborohydride, 9-BBN-pyridine, tributyltin hydride, diisobutylaluminium hydride, L-selectride, diborane, diazene, aluminum hydride, and the like. The reaction may further take place with our without a catalyst, for example a metal catalyst. In some embodiments, sodium borohydride may be used as the reducing agent. In some embodiments, lithium aluminum hydride may be used as the reducing agent. In some embodiments, diborane may be used as the reducing agent. The reduction reaction may be conducted at any pH known to be useful for the reduction reaction. In some embodiments, the method comprises reduction of the oxidized cellulosic material at a neutral to alkaline pH.

In some embodiments, the oxidized pulp may be treated with a reducing agent in an amount of from about 0.1% to about 1% based on the dry weight of the cellulosic pulp, for example, from about 0.2% to about 0.8% or from about 0.25% to about 0.5%. In some embodiments, the reduction reaction may be carried out at a pH ranging from about 6 to about 14, for example, from about 8 to about 13 or from about 10 to about 12. In some embodiments, the reduction reaction may be carried out for a time period ranging from 5 to about 90 minutes (for example from about 30 to about 60 minutes) at a temperature ranging from about 60 to about 80° C. (for example about 70° C.).

The reduction reaction of the cellulosic material may occur at any point during production of the cellulosic pulp that follows the oxidation step, including before or after prehydrolysis, before or after Kraft pulping, before or after oxygen delignification, before or after bleaching, or during one or more stages of the bleaching process. In some embodiments, the method comprises both oxidizing and reducing the cellulosic material during one or more stages of a multi-stage bleaching sequence. In some embodiments, at least one additional bleaching stage follows the oxidation and reducing stages. In some embodiments, where the multi-stage bleaching sequence comprises a cold caustic extraction stage, both the oxidation and reduction processes may take place prior to the cold caustic extraction stage. In some embodiments, where the multi-stage bleaching sequence comprises a cold caustic extraction stage, both the oxidation and reduction processes may take place following the cold caustic extraction stage. In some embodiments, where the multi-stage bleaching sequence comprises a cold caustic extraction stage, the oxidation process may take place in a bleaching stage before the cold caustic extraction stage and the reducing process may take place in a bleaching stage following the cold caustic extraction stage. In some embodiments, the cellulosic material may be further reduced in one or more additional reducing stages following the oxidation process.

In some embodiments, the multi-stage bleaching process sequence may be a five-stage bleaching sequence comprising at least one oxidation stage and at least one reduction stage. For example, the multi-stage bleaching process sequence may be $D_0P*BED_2$, $D_0P*D_1BD_2$, $D_0P*D_1EB$, $D_0ED_1P*B$, $D_0P*BP*D_2$, $D_0P*D_1P*B$, $D_0P*BP*B$ and the like, wherein "D" refers to a bleaching stage comprising chlorine dioxide; "P*" refers to an oxidation treatment stage, "B" refers to reduction treatment stage, and "E" refers to an alkaline extraction stage including, for example E, $E_O$, $E_P$, or $E_{OP}$ bleaching stages (wherein "$E_O$" represents an alkaline extraction stage comprising treatment with oxygen, "$E_P$" represents an alkaline extraction stage comprising treatment with a peroxide, and "$E_{OP}$" represents an alkaline extraction stage comprising treatment with oxygen and a peroxide).

In some embodiments, the multi-stage bleaching process sequence may be a five-stage bleaching sequence comprising at least one oxidation stage, wherein at least one reduction treatment follows the multi-stage bleaching process. For example, the sequence may be $D_0P*D_1ED_2$-B, $D_0ED_1P*D_2$-B, $D_0P*D_1P*D_2$-B.

In some embodiments, the multi-stage bleaching process sequence may be other than a five-stage bleaching sequence, for example a four-stage bleaching sequence, a three-stage bleaching sequence, or a six-stage bleaching sequence. For example, the multi-stage bleaching process sequence may be $D_0EP*B$, $D_0P*D_1B$, $D_0P*B$, or $D_0P*BD_1ED_2$, and the like.

In some embodiments, the multi-stage bleaching process sequence may be a four or three-stage bleaching sequence comprising at least one oxidation stage, wherein at least one reduction treatment follows the multi-stage bleaching process. For example, the sequence may be $D_0EP*D_1$-B, $D_0P*ED_1$-B, $D_0P*D_1E$-B, $D_0ED_1P*$-B, $D_0P*D_1P*$-B, $D_0P*D_1D_2$-B, $D_0P*D_1$-B, DEP*-B, or DP*E-B.

Carboxylation Treatment

In some embodiments, the oxidized pulp may further be subjected to at least one treatment with a carboxylating agent that converts aldehyde functional groups to carboxyl functional groups. The carboxylation treatment may occur at any point during production of the cellulosic pulp that follows the oxidation step, including before or after prehydrolysis, before or after Kraft pulping, before or after oxygen delignification, before or after bleaching, before and/or after reduction treatment, or during one or more stages of the bleaching process. In some embodiments, the carboxylation treatment may take place after oxidation and before reduction treatment. In some embodiments, the carboxylation treatment may take place after oxidation and after reduction treatment. In some embodiments, the carboxylation treatment may take place after oxidation and both before reduction treatment and after reduction treatment. In some embodiments, the cellulose may be treated with a carboxylating agent both prior to and after oxidation.

In some embodiments, the carboxylating agent may be a carboxylating acid, for example, chlorous acid, acidic potassium dichromate, and/or potassium permanganate. In some embodiments, the treatment of the oxidized pulp with a carboxylating agent may involve treating the oxidized pulp with a chlorous acid source, such as sodium chlorite and hydrogen peroxide or chlorine dioxide and hydrogen peroxide. In some embodiments, the method comprises treating the oxidized pulp with a carboxylating agent comprising sodium chlorite and hydrogen peroxide. In some embodiments, the method comprises treating the oxidized pulp with a carboxylating agent comprising chlorine dioxide and hydrogen peroxide.

In some embodiments, a carboxylating agent may be added to the oxidized pulp in an amount sufficient to achieve the desired carboxyl functionality of the final cellulose product. For example, sodium chlorite or chlorine dioxide can be added to the oxidized cellulose as a source of chlorous acid, as a solution at a concentration from about 0.1% to about 5%, for example, from about 0.25% to about 1.5%, from about 1.5% to about 2.5%, or from about 2.5% to about 5% by weight based on the dry weight of the pulp; and hydrogen peroxide can be added at a concentration of at least about 0.1%, at least about 0.25%, at least about 0.5%, at least about 1.0%, at least about 1.5%, or at least about 2%, at least about 2.5%, or at least about 3%, for example, from about 0.1% to about 5%, or from about 0.25% to about 1%, from about 1% to about 2%, or from about 2.5% to 5% by weight based on the dry weight of the pulp.

In some embodiments, the carboxylating treatment may be carried out for a time and at a temperature that is sufficient to produce the desired completion of the reaction. For example, the carboxylating treatment may be carried out at a temperature of at least about 55° C., or at least about 80° C., and for a time ranging from about 15 to about 120 minutes, for example, from about 15-to about 60 minutes, or from about 120 to about 150 minutes. The desired time and temperature of the carboxylating treatment will be readily ascertainable by a person of skill in the art depending on the desired conversion of aldehyde to carboxyl groups.

In some embodiments, the method may comprise carboxylating the cellulosic material during one or more stages of a multi-stage bleaching sequence. For example, in any of the example bleaching sequences discussed above, one or more of the "D" stages may be replaced with a carboxylating treatment stage "$D_{(C/A)}$," comprising, for example, treatment with chlorine dioxide and hydrogen peroxide or sodium chlorite and hydrogen peroxide. For example, in a five-stage bleaching process, the third bleaching stage may be a $D_{(C/A)}$ stage, the fifth bleaching stage may be a $D_{(C/A)}$ stage, the third and fifth bleaching stages may both be $D_{(C/A)}$ stages, or the first, third, and fifth bleaching stages may all be $D_{(C/A)}$ stages. Similarly, in a four-stage bleaching sequence, for example, the third bleaching stage may be a $D_{(C/A)}$ stage, the fourth bleaching stage may be a $D_{(C/A)}$ stage, the first and third bleaching stages may both be $D_{(C/A)}$ stages, or the first and fourth bleaching stages may both be $D_{(C/A)}$ stages.

Fiber Properties

In some embodiments, when the oxidized cellulose is a softwood Kraft fiber, the open chain modified cellulosic pulp described herein may have a length-weighted average fiber length that is about 2 mm or greater. Fiber length may be determined on a Fiber Quality Analyzer™ from OPTEST, Hawkesbury, Ontario, according to the manufacturer's standard procedures. In some embodiments, the average fiber length is no more than about 3.7 mm. In some embodiments, the average fiber length is at least about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, or about 3.7 mm. In some embodiments, the average fiber length ranges from about 2 mm to about 3.7 mm or from about 2.2 mm to about 3.7 mm.

In some embodiments, the open chain modified cellulosic pulp described herein may have a final ISO brightness of at least about 88%, for example at least about 90%, at least about 91%, at least about 92%, or at least about 93%. Brightness may be determined according to TAPPI T525-om02. In some embodiments, the open chain modified cellulosic pulp described herein may have CIE whiteness of at least about 85%, for example at least about 86%, at least about 87%, or at least about 88%. CIE Whiteness may be determined according to TAPPI Method T560. In some embodiments, the open chain modified cellulosic pulp described herein may have a b* color value of less than about 3, for example less than about 2.5, less than about 2.25, or less than about 2. The b* color value may be determined according to TAPPI T527.

In some embodiments, the open chain modified cellulosic pulp described herein may have a viscosity ranging from about 3.0 mPa·s to about 20 mPa·s, for example from about 7 mPa·s to about 18 mPa·s, from about 9 mPa·s to about 18 mPa·s, from about 10 mPa·s to about 16 mPa·s, or from about 11 mPa·s to about 14 mPa·s. Viscosity may be measured according to TAPPI T230-om99. Without wishing to be bound by theory, it is believed that the measured viscosity of a sample taken after the reduction process may increase over the measured viscosity of a sample taken after the oxidation process, as the conversion of dialdehyde groups to primary alcohol groups by the reduction reaction may prevent degradation of the pulp that occurs during the alkaline conditions used in viscosity test method TAPPI T230-om99. In some embodiments, the viscosity of the open chain modified cellulosic pulp described herein may be greater than 4 mPa·s, greater than 6 mPa·s, greater than 8 mPa·s, greater than 10 mPa·s, greater than 12 mPa·s, or greater than 14 mPa·s.

In some embodiments, particularly where a carboxylating treatment occurs in between an oxidation treatment and a reduction treatment, the viscosity may not be significantly increased following reduction treatment as compared to the viscosity of the sample taken after the oxidation treatment. In such cases, the viscosity of the open chain modified cellulosic pulp described herein may be less than 7 mPa·s, for example, less than 6 mPa·s, less than 5 mPa·s, less than 4 mPa·s, or less than 3 mPa·s.

In some embodiments, the open chain modified cellulosic pulp described herein may have a carboxyl content of less than about 5 meq/100 g, for example, less than about 3 meq/100 g, less than about 2 meq/100 g, or less than about 1 meq/100 g. Carboxyl content may be measured according to TAPPI T237-cm98. In some embodiments, the carboxyl content of the open chain modified cellulosic pulp may range from about 0.1 meq/100 g to about 5 meq/100 g, for example from about 0.5 meq/100 g to about 2 meq/100 g.

In some embodiments, particularly those where a carboxylation treatment has been employed, the open chain modified cellulosic pulp described herein may have a carboxyl content of greater than about 5 meg/100 g, for example, greater than about 6 meq/100 g, greater than about 8 meq/100 g, or greater than about 10 meq/100 g.

In some embodiments, the open chain modified cellulosic pulp described herein may have an aldehyde content of less than about 2 meq/100 g, for example, less than about 1 meq/100 g, less than about 0.5 meq/100 g, or less than about 0.1 meq/100 g. Aldehyde content may be measured according to Econotech Services LTD procedure ESM 055B. In some embodiments, the aldehyde content of the open chain modified cellulosic pulp may range from about 0.01 meq/100 g to about 2 meq/100 g, for example from about 0.01 meq/100 g to about 1 meq/100 g, or from about 0.01 meq/100 g to about 0.5 meq/100 g.

In some embodiments, the open chain modified cellulosic pulp described herein may have a copper number ranging from about 0.01 to about 5. Copper Number is measured according to TAPPI T430-cm99. In some embodiments, the copper number is less than about 4, for example, less than about 2, less than about 1, less than about 0.5, less than about 0.2, or less than about 0.1.

In some embodiments, the open chain modified cellulosic pulp described herein may have an carbonyl content of less than about 2 meq/100 g, for example, less than about 1 meq/100 g, less than about 0.5 meq/100 g, or less than about 0.1 meq/100 g. Carbonyl content is calculated from Copper Number according to the formula: carbonyl=(Cu. No.−0.07)/0.6, from *Biomacromolecules* 2002, 3, 969-975. In some embodiments, the carbonyl content of the open chain modified cellulosic pulp may range from about 0.01 meq/100 g to about 2 meq/100 g, for example from about 0.01 meq/100 g to about 1 meq/100 g, or from about 0.01 meq/100 g to about 0.5 meq/100 g.

In some embodiments, the open chain modified cellulosic pulp described herein may have a ratio of carbonyl content to carboxyl content from about 1:10 to 5:1, for example from about 1:5 to about 3:1, from about 1:3 to 1:1, or from about 1:1.5 to 1:1.

In some embodiments, particularly those where a carboxylation treatment has been employed, the open chain modified cellulosic pulp described herein may have a ratio of carbonyl content to carboxyl content from about 1:20 to 1:1, for example from about 1:10 to about 1:5.

In some embodiments, the open chain modified cellulosic pulp described herein may have a hemicellulose content that is substantially the same as the cellulose prior to oxidation and reduction treatment. For example, the hemicellulose content for a softwood Kraft fiber may range from about 14% to about 18%, for example from about 14% to about 15%. Similarly, the hemicellulose content of a hardwood Kraft fiber may range from about 18% to about 30%. Hemicellulose content is calculated from the sum of the carbohydrate content of the pulp minus the cellulose content. Cellulose content is calculated from carbohydrate content according to the formula: Cellulose=Glucan-(Mannan/3), from *TAPPI Journal* 65(12):78-80 1982. Carbohydrate content is measured according to TAPPI T249-cm00 with analysis by Dionex ion chromatography.

In some embodiments, the open chain modified cellulosic pulp described herein may have a reduced hemicellulose content of less than about 10%, for example less than about 8%, less than about 6%, less than about 4%, or less than about 2%. In some embodiments, the open chain modified cellulosic pulp described herein may have a hemicellulose content of from about 2% to about 6%.

In some embodiments, the open chain modified cellulosic pulp described herein may have an R10 value ranging from about 90% to about 99%, for instance from about 93% to about 98%, or from about 95% to about 97%. In some embodiments, the open chain modified cellulosic pulp described herein may have an R18 value ranging from about 92% to about 99%, for instance from about 95% to about 99%, or from about 97% to about 99%. R18 and R10 may be measured according to TAPPI 235.

R10 represents the residual undissolved material that is left extraction of the pulp with 10 percent by weight caustic and R18 represents the residual amount of undissolved material left after extraction of the pulp with an 18% caustic solution. Generally, in a 10% caustic solution, hemicellulose and chemically degraded short chain cellulose are dissolved and removed in solution. In contrast, generally only hemicellulose is dissolved and removed in an 18% caustic solution. Thus, the difference between the R10 value and the R18 value, (ΔR=R18-R10), represents the amount of chemically degraded short chained cellulose that is present in the pulp sample. In some embodiments, the open chain modified cellulosic pulp described herein may have a ΔR of less than about 4, for example less than about 3, less than about 2, less than about 1, or less than about 0.5.

In some embodiments, the open chain modified cellulosic pulp described herein may have a lower crystallinity than a pulp made by a process not comprising the oxidation and reduction steps disclosed herein. For example, the open chain modified cellulosic pulp described herein may exhibit a crystallinity index that is reduced by at least 2% relative to the starting crystallinity index as measured before the oxidation stage, for example, by at least 5%, by at least 10%, or by at least 20%. Crystallinity index may be measured by X-ray diffraction, solid-state $^{13}C$ nuclear magnetic resonance, infrared spectroscopy or Ramen spectroscopy. X-ray diffraction is preferred:

The open chain modified cellulosic pulp described herein may also have an increased percentage of C2 and C3 carbons located on the β-D-1,4-anhydroglucose monomers that are primary alcohols, compared to cellulosic pulps that have not been subjected to the oxidation and reduction steps detailed herein. In some embodiments, at least about 1% of the C2 and C3 carbons of the βD-1,4-anhydroglucose monomers of the open chain modified cellulosic pulp described herein may be primary alcohols, for example at least about 2%, at least about 5%, at least about 10%, or at least about 20%. The percentage of the C2 and O3 carbons of the β-D-1,4-anhydroglucose monomers of the open chain modified cellulosic pulp described herein may determine by an appropriate method, for example, spectroscopy, high performance liquid chromatography, or X-ray diffraction.

Cellulosic Derivative Products

The open chain modified cellulosic pulp described herein can be used in the production of a variety of cellulosic derivative products. In some embodiments, the open chain modified cellulosic pulp described herein can be used as a partial or full substitute for high-alpha, cotton linter, or sulfite pulp in the production of such products. In some embodiments, the cellulosic derivative products may be made by subjecting the open chain modified cellulosic pulp described herein to a chemical reaction that converts a plurality of hydroxyl groups on the β-D-1,4-anhydroglucose monomers of the open chain modified cellulosic pulp to substituents other than hydroxyl groups. In some embodiments, the chemical reaction may be an esterification reaction. In some embodiments, the chemical reaction may be an etherification reaction. In some embodiments, the chemical reaction may be a xanthation reaction.

Without being bound by theory, it is believed that the open chain modified cellulosic pulp described herein exhibits improved accessibility to hydroxyl groups located on the cellulose anhydroglucose monomers in the form of primary alcohols, leading to increased dissolution, reactivity and/or conversion efficacy when used as starting materials in processes for preparing cellulosic derivative products.

In some embodiments, the open chain modified cellulosic pulp described herein has chemical properties that make it suitable for the manufacture of cellulose ether derivative products. Thus, the disclosure provides a cellulose ether product derived from the open chain modified cellulosic-pulp described herein. In some embodiments, the cellulose ether derivative product may be chosen from ethylcellulose, methylcellulose, hydroxypropyl cellulose, carboxymethyl cellulose, hydroxypropyl methylcellulose, hydroxyethyl cellulose, hydroxyethyl methyl cellulose, and the like. It is believed that the cellulose ether derivative products of the disclosure may be used in any application where cellulose ethers are traditionally used. For example, and not by way of limitation, the cellulose ethers of the disclosure may be used in coatings, inks, binders, controlled release drug tablets, and films.

In some embodiments, the open chain modified cellulosic pulp described herein has chemical properties that make it suitable for the manufacture of cellulose esters. Thus, the disclosure provides a cellulose ester product derived from the open chain modified cellulosic pulp described herein. In some embodiments, the cellulose ester derivative product may be a cellulose acetate (for example cellulose acetate, cellulose diacetate, cellulose triacetate, cellulose acetate butyrate, and cellulose acetate propionate) derived from the open chain modified cellulosic pulp described herein. It is believed that the cellulose esters derivative products of the disclosure may be used in any application where cellulose esters are traditionally used. For example, and not by way of limitation, the cellulose esters of the disclosure may be used in home furnishings, cigarettes, inks, absorbent products, medical devices, films, and plastics including, for example, LCD and plasma screens and windshields.

In some embodiments, the open chain modified cellulosic pulp described herein can be used in the production of a regenerated cellulose product, for example viscose, rayon, and the like. The manufacture of such regenerated cellulosic products often involves the derivatization of the cellulosic pulp in order to aid in dissolution of the material prior to being regenerated and spun into fibers. In some embodiments, the derivatization process is a xanthation process.

In some embodiments, the open chain modified cellulosic pulp described herein can be used in the production of other specialty cellulosic derivative products, for example, nitrocellulose, plastic molding compounds, microcrystalline cellulose, casings, cellophane, tire cord, and the like.

Without wishing to be bound by theory, it is further believed that the open chain modified cellulosic pulp described herein may exhibit improved dissolution, as involved in the production of other products. In some embodiments, the open chain modified cellulosic pulp described herein can be used in a lyocell product.

Descriptions of the disclosed embodiments are not exhaustive and are not limited to the precise forms or embodiments disclosed. Modifications and adaptations of the embodiments will be apparent from consideration of the specification and practice of the disclosed embodiments.

Example 1

A southern softwood kraft, oxygen delignified pulp was collected from the first chlorine dioxide ($D_0$) washer of a five-stage bleach plant and used for testing.

The $D_0$ pulp was further treated with $P^*D_{(c/a)}BD_2$ bleaching stages, where $P^*$ is an acidic catalyzed peroxide oxidation stage, $D_{(c/a)}$ is a chlorine dioxide stage with hydrogen peroxide added to enhance the production of chlorous acid, B is a sodium borohydride stage, and $D_2$ is a final chlorine dioxide stage. The $P^*$ stage was done with four different levels of applied $H_2O_2$ and $Fe^{+2}$ and each was followed by a $D_{(c/a)}$ stage. Each of these pulps was then treated with one of three levels of sodium borohydride, followed by the final $D_2$ stage with a set application of $ClO_2$. The sodium borohydride was supplied as a commercial solution, Boromet 10®, from Montgomery Chemical's, Conshohocken, Pa. The basic process conditions and chemical applications are shown in Table 1.

TABLE 1

Process Conditions for $D_0P^*D_{(c/a)}BD_2$ Sequence

| | | | Chemicals | | | |
|---|---|---|---|---|---|---|
| Stage | Time min | Temp. ° C. | $H_2O_2$ (%) | $ClO_2$ (%) | $NaBH_4$ (%) | $Fe^{+2}$ (ppm) |
| $D_0$ | | | | | | |
| $P^*$ | 90 | 80 | 1.5 | n/a | n/a | 150 |
| or $P^*$ | 90 | 80 | 2.0 | n/a | n/a | 200 |
| or $P^*$ | 90 | 80 | 2.5 | n/a | n/a | 250 |
| or $P^*$ | 90 | 80 | 3.0 | n/a | n/a | 300 |
| $D_1$(C/A) | 150 | 80 | 1.6 | 2.0 | n/a | n/a |
| B | 45 | 50 | n/a | n/a | 0.10 | n/a |
| or B | 45 | 50 | n/a | n/a | 0.25 | n/a |
| or B | 45 | 50 | n/a | n/a | 0.45 | n/a |
| $D_2$ | 150 | 80 | n/a | 0.25 | n/a | n/a |

Figure 2:
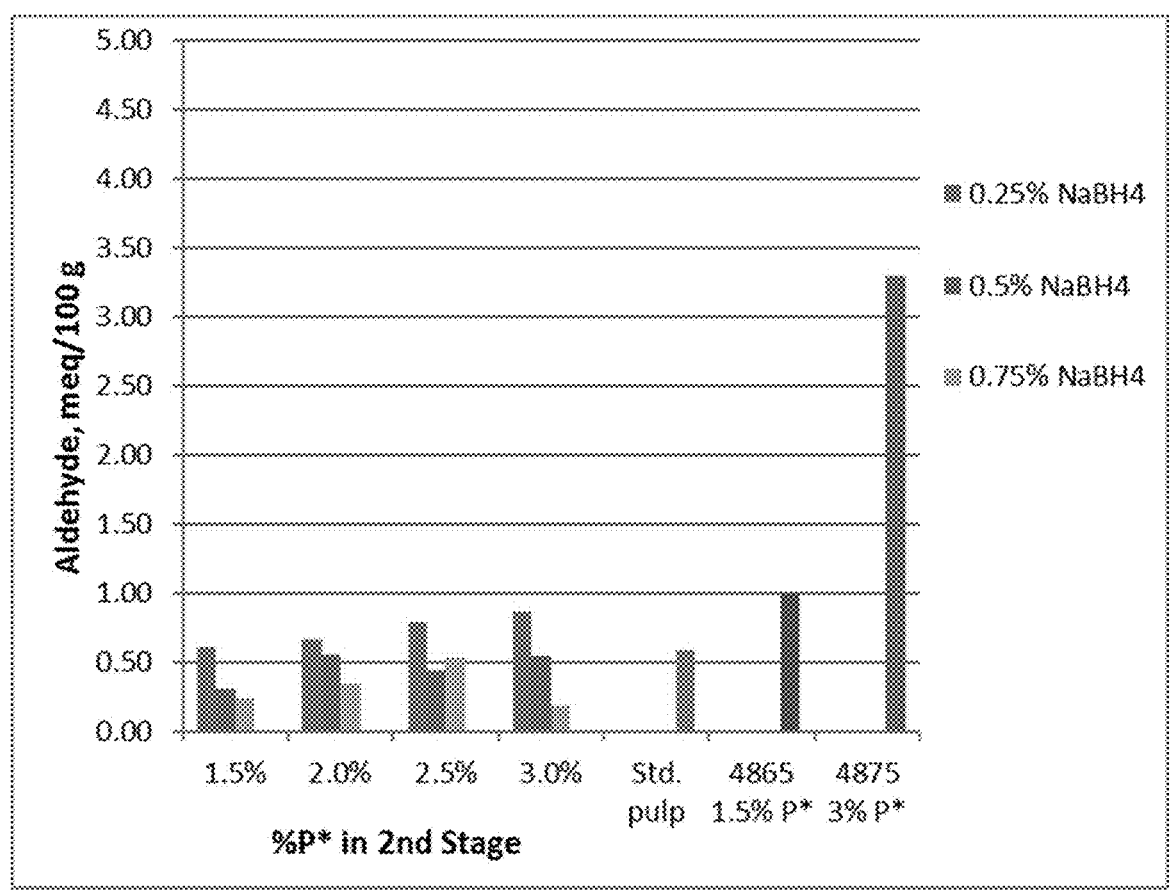
FIG. 2 shows the aldehyde content results from Example 1.
Figure 3:
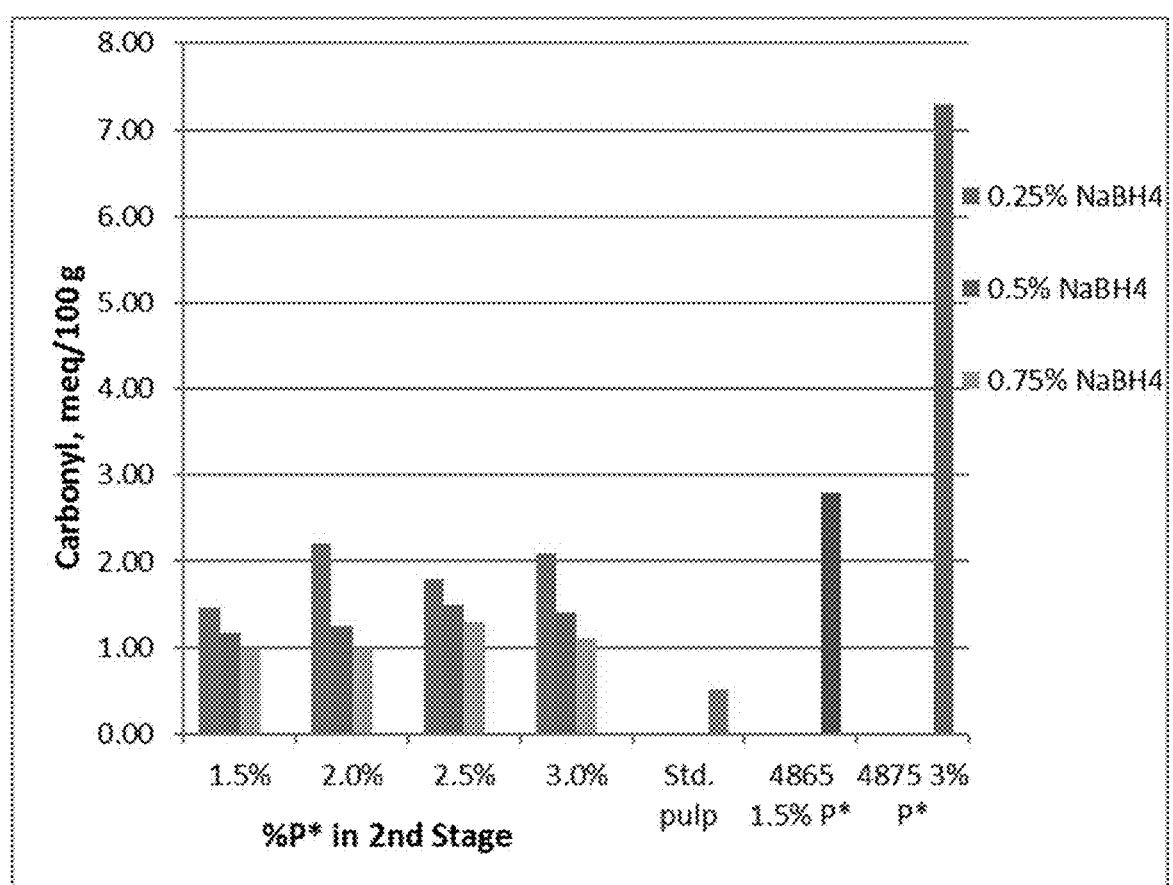
FIG. 3 shows the carbonyl content results from Example 1.
Figure 4:
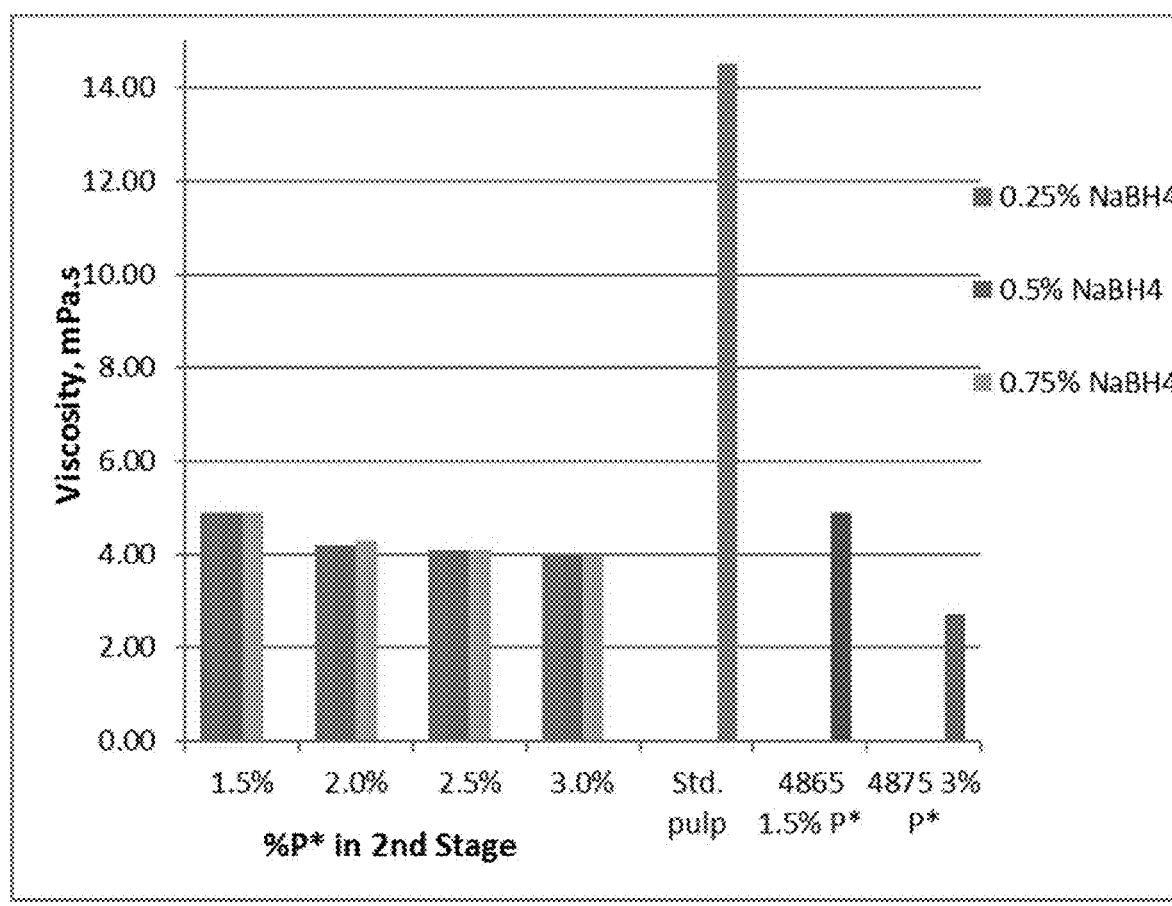
FIG. 4 shows the viscosity content results from Example 1.
Figure 5:
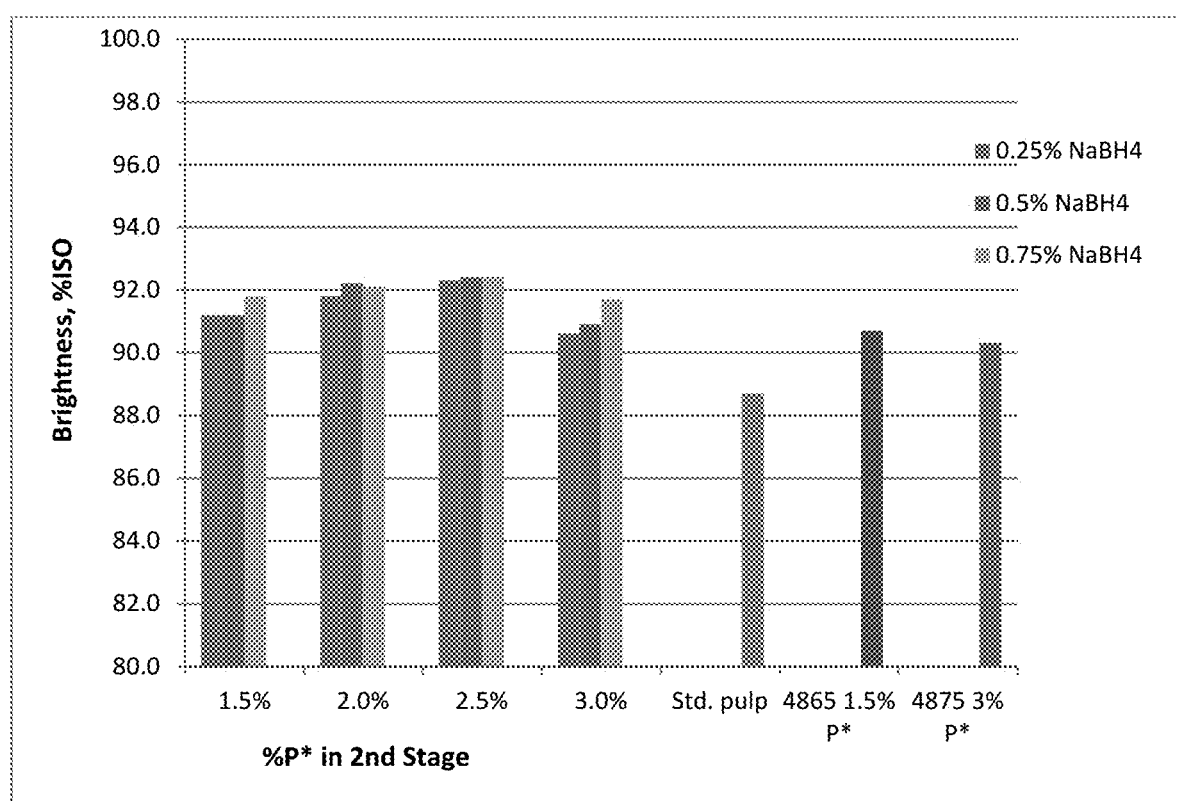
FIG. 5 shows the brightness content results from Example 1.

The final bleached pulps were tested for brightness, viscosity, and functional groups, including carboxyls, aldehydes, and carbonyls (calculated from copper no.). The functional group contents are shown in FIGS. 1, 2, and 3 for carboxyl, aldehyde, and carbonyl content respectively. The viscosity and brightness are shown in FIGS. 4 and 5 respectively. For comparison, the results for a standard pulp bleached with a $DE_{OP}DE_PD$ sequence (Std.), a pulp bleached with a $DP^*D_{(c/a)}E_PD$ sequence (4865), and a pulp bleached with a $DP^*D_{(c/a)}P^*D_{(c/a)}$ sequence (4875) are also shown in those figures.

This example shows, among other things, that the use of a reducing agent, sodium borohydride, in the fourth stage of a bleach sequence, significantly reduces the aldehyde and carbonyl contents compared to sequences using $P^*$ without any reducing agent.

Example 2

The same $D_0$ pulp from Example 1 was used for testing a $DP^*D_{(c/a)}P^*D_{(c/a)}$-B sequence, where a sodium borohydride treatment was done following the final $D_{(c/a)}$ bleaching stage. Each of the $D_{(c/a)}$ stages had $H_2O_2$ added to enhance chlorous acid production. The sodium borohydride "B" stage treatment was done at three different levels. The process conditions and chemical applications are shown in Table 2.

TABLE 2

Process Conditions for DP*D$_{(c/a)}$P*D$_{(c/a)}$B Sequence

| Stage | Time min | Temp. °C | Chemicals | | | |
|---|---|---|---|---|---|---|
| | | | H$_2$O$_2$ (%) | ClO$_2$ (%) | NaBH$_4$ (%) | Fe$^{+2}$ (ppm) |
| D$_0$ | | | | | | |
| P* | 90 | 80 | 1.5 | n/a | n/a | 150 |
| D$_{1(C/A)}$ | 150 | 80 | 1.2 | 1.6 | n/a | n/a |
| P* | 90 | 80 | 1.5 | n/a | n/a | 150 |
| D$_{2(C/A)}$ | 150 | 80 | 0.8 | 0.8 | n/a | n/a |
| B | 45 | 50 | n/a | n/a | 0.10 | n/a |
| or B | 45 | 50 | n/a | n/a | 0.25 | n/a |
| or B | 45 | 50 | n/a | n/a | 0.45 | n/a |

Figure 6:
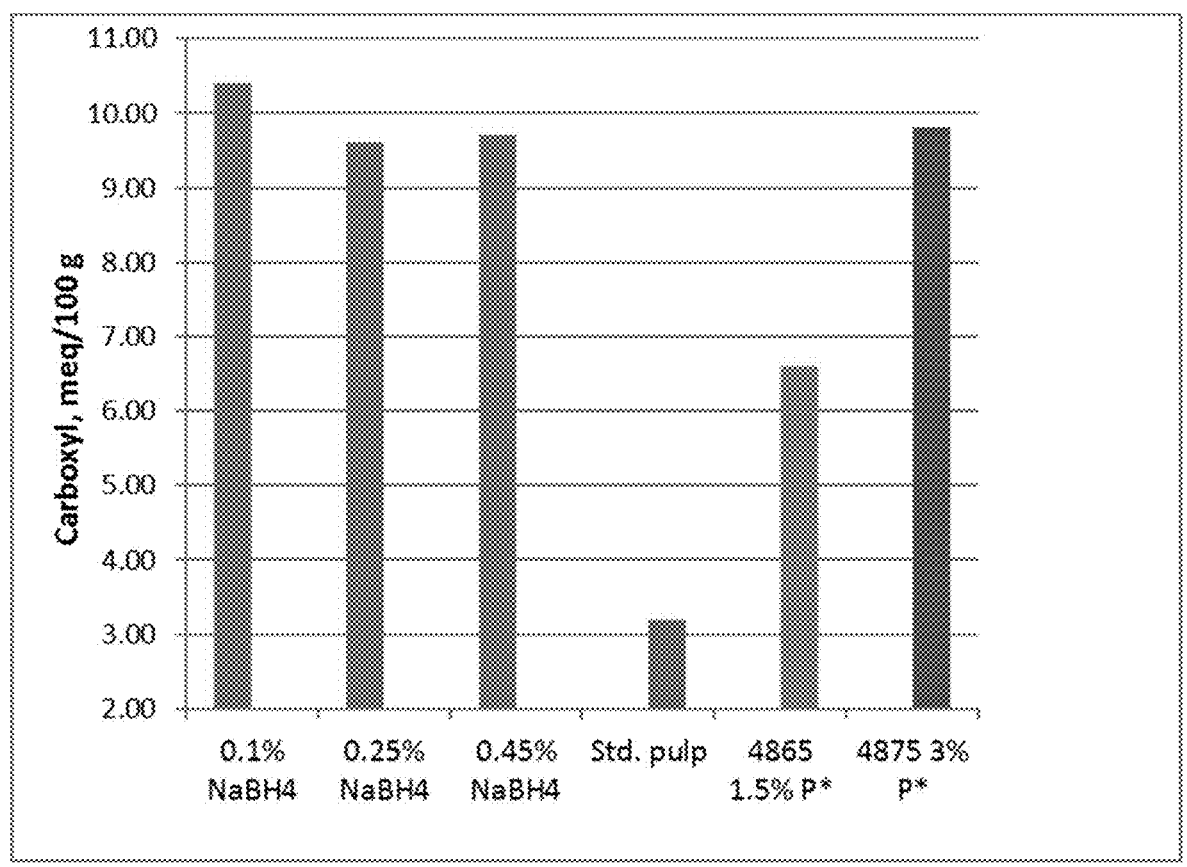
FIG. 6 shows the carboxyl content results from Example 2.
Figure 7:
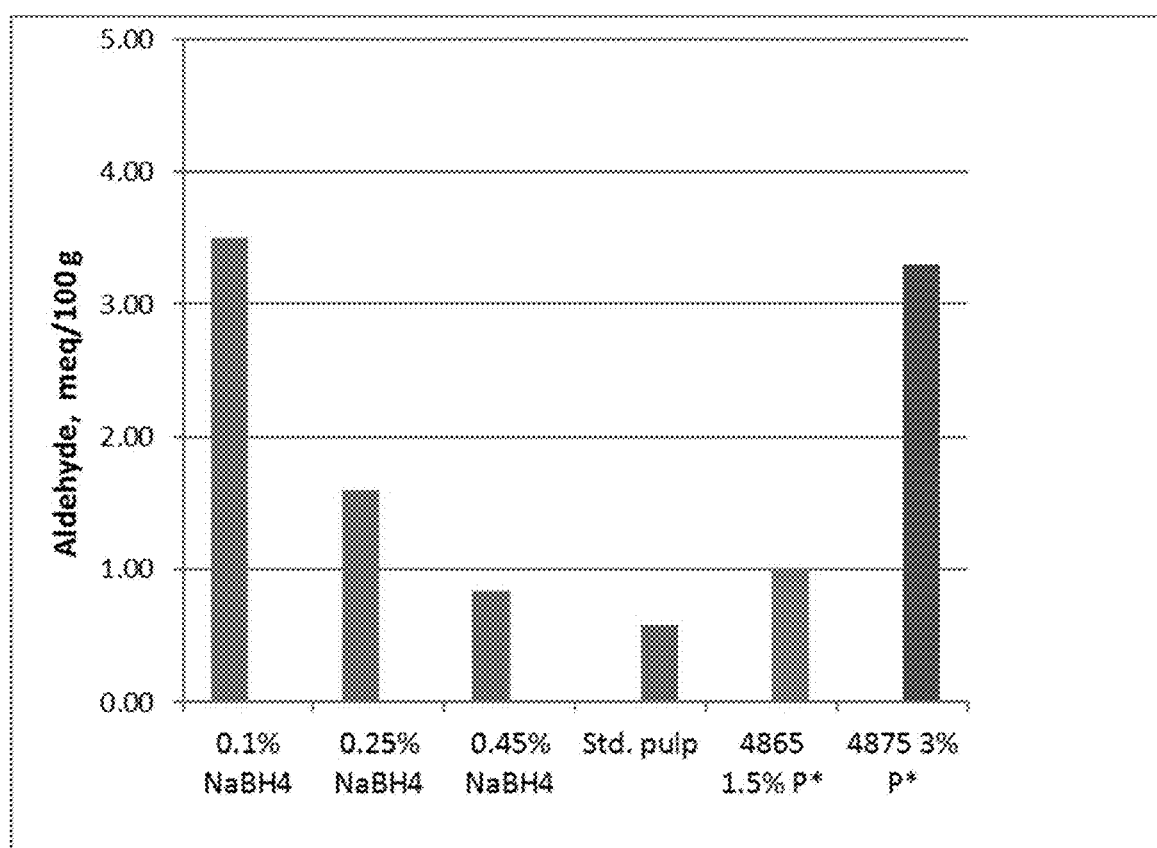
FIG. 7 shows the aldehyde content results from Example 2.
Figure 8:
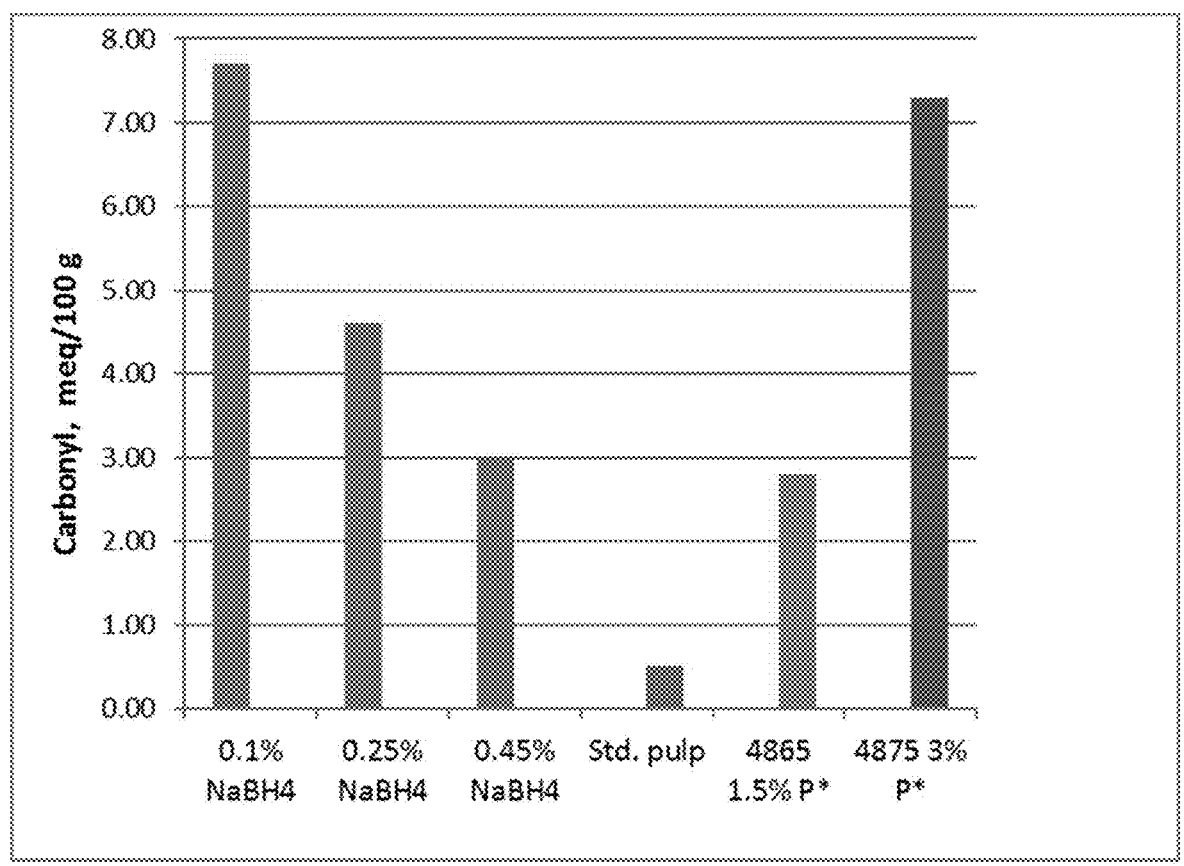
FIG. 8 shows the carbonyl content results from Example 2.
Figure 9:
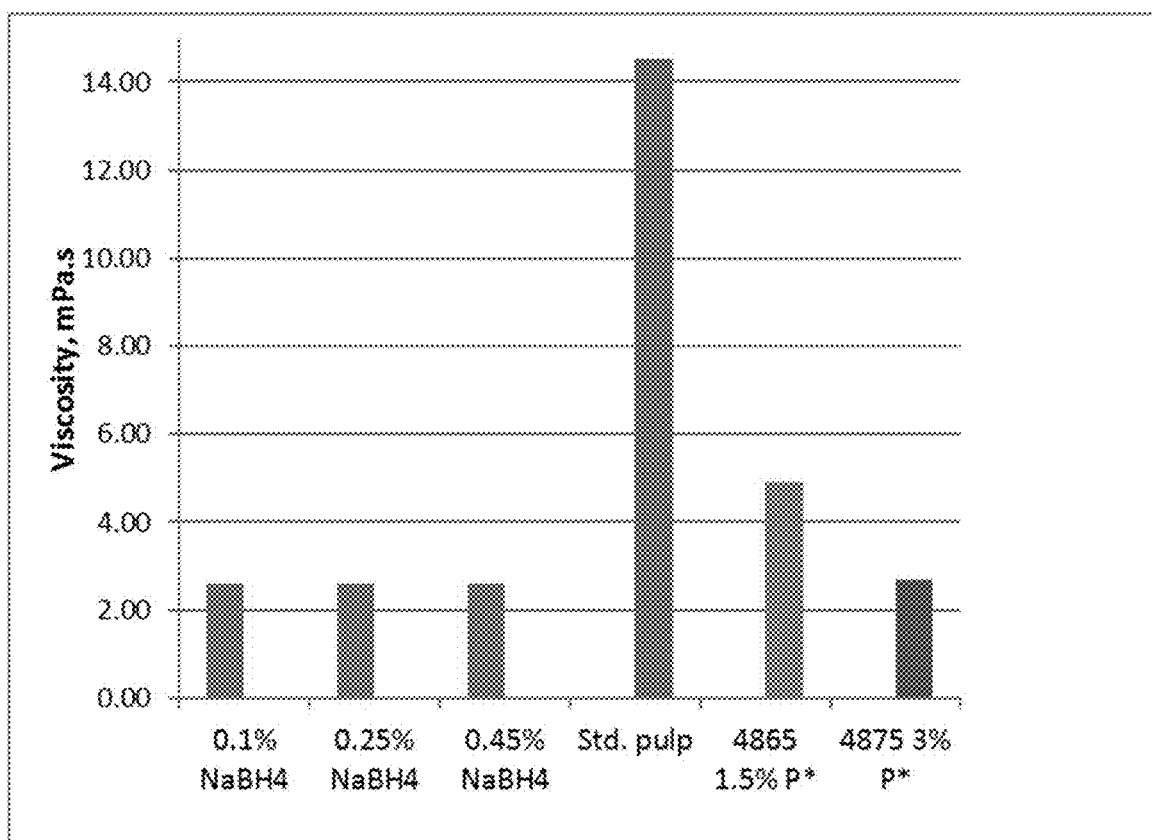
FIG. 9 shows the viscosity content results from Example 2.
Figure 10:
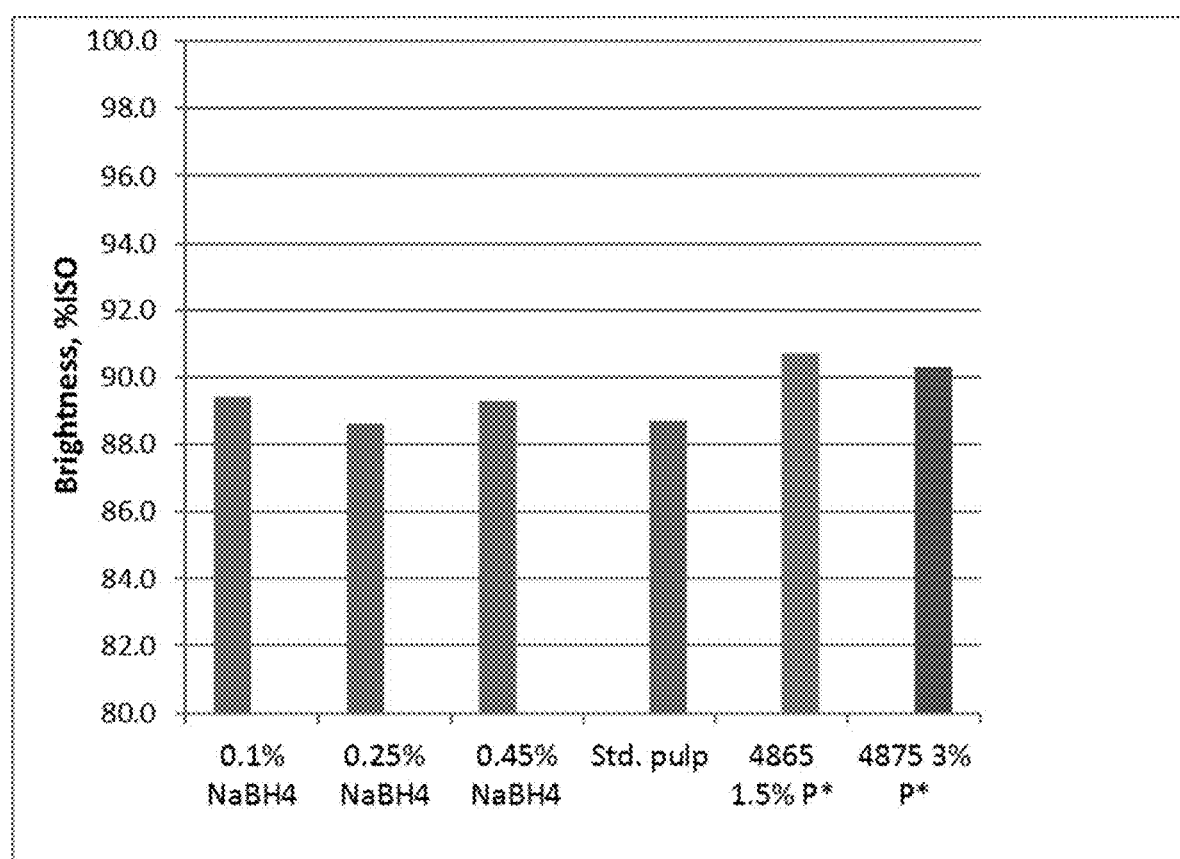
FIG. 10 shows the brightness content results from Example 2.

The final bleached pulps were tested for brightness, viscosity, and functional groups, including carboxyls, aldehydes, and carbonyls (calculated from copper no.). The functional group contents are shown in FIGS. 6, 7, and 8 for carboxyl, aldehyde, and carbonyl content respectively. The viscosity and brightness are shown in FIGS. 9 and 10 respectively. For comparison, the results for a standard pulp bleached with a DE$_{OP}$DE$_P$D sequence (Std.), a pulp bleached with a DP*D$_{(c/a)}$E$_P$D sequence (4865), and a pulp bleached with a DP*D$_{(c/a)}$P*D$_{(c/a)}$ sequence (4875) are also shown in those figures This example shows, among other things, that the aldehyde and carbonyl contents can be reduced compared to the DP*D$_{(c/a)}$P*D sequence when a sufficient quantity of sodium borohydride is applied following the bleach sequence.

We claim:

1. A method of making a cellulosic derivative product comprising:
   obtaining an open chain modified cellulosic pulp having primary hydroxyl groups at the C2 and C3 carbons prepared by a method comprising oxidizing a cellulosic pulp in at least one oxidation step to form an oxidized cellulosic pulp, wherein the oxidation step is carried out with hydrogen peroxide and a metal catalyst comprising copper or iron or both at a pH from about 2 to about 6, and subjecting the oxidized cellulosic pulp to a reduction reaction in at least one reduction step, wherein the reduction is carried out with a reducing agent chosen from at least one of lithium aluminum hydride, sodium borohydride, sodium cyanoborohydride, 9-BBN-pyridine, tributyltin hydride, diisobutylaluminium hydride, L-selectride, diborane, diazene, and aluminum hydride, and
   subjecting the open chain modified cellulosic pulp to a chemical reaction that converts a plurality of the primary hydroxyl groups on the open chain modified cellulosic pulp to substituents other than hydroxyl groups in order to form a cellulosic derivative product.

2. The method of claim 1, wherein the cellulosic pulp has a copper number less than about 1 prior to the at least one oxidation step, wherein the cellulosic pulp is oxidized to a copper number of greater than about 3 at the end of the at least one oxidation step, and wherein the oxidized cellulose is reduced to a copper number of less than about 0.5 at the end of the reduction step.

3. The method of claim 1, wherein the at least one oxidizing step is carried out during at least one stage of a multi-stage bleaching process.

4. The method of claim 1, wherein the reducing agent is sodium borohydride.

5. The method of claim 4, wherein the at least one reduction step is carried out at a pH of at least 7.

6. The method of claim 1, further comprising subjecting the oxidized cellulosic pulp to at least one carboxylation step comprising a combination of sodium chlorite and hydrogen peroxide or a combination of chlorine dioxide and hydrogen peroxide, wherein the carboxylation step takes place after the at least one oxidation step and before the at least one reduction step.

7. The method of claim 1, wherein the chemical reaction is an etherification reaction.

8. The method of claim 7, wherein the cellulosic derivative product is chosen from ethylcellulose, methylcellulose, hydroxypropyl cellulose, carboxymethyl cellulose, hydroxypropyl methylcellulose, hydroxyethyl cellulose, and hydroxyethyl methyl cellulose.

9. The method of claim 1, wherein the chemical reaction is an esterification reaction.

10. The method of claim 9, wherein the cellulosic derivative product is chosen from cellulose acetate, cellulose diacetate, cellulose triacetate, cellulose acetate butyrate, and cellulose acetate propionate.

11. The method of claim 1, wherein the chemical reaction is a xanthation reaction.

12. The method of claim 11, wherein cellulosic derivative product is rayon.

13. The method of claim 1, further comprising subjecting the open chain modified cellulosic pulp to at least one carboxylation step comprising a combination of sodium chlorite and hydrogen peroxide or a combination of chlorine dioxide and hydrogen peroxide, wherein the at least one carboxylation step takes place after the reduction step and before subjecting the open chain modified cellulosic pulp to the chemical reaction.

14. The method of claim 7, further comprising subjecting the oxidized cellulosic pulp to at least one carboxylation step comprising a combination of sodium chlorite and hydrogen peroxide or a combination of chlorine dioxide and hydrogen peroxide, wherein the carboxylation step takes place after the at least one oxidation step and before the at least one reduction step.

15. The method of claim 7, further comprising subjecting the open chain modified cellulosic pulp to at least one carboxylation step comprising a combination of sodium chlorite and hydrogen peroxide or a combination of chlorine dioxide and hydrogen peroxide, wherein the at least one carboxylation step takes place after the reduction step and before subjecting the open chain modified cellulosic pulp to the chemical reaction.

16. The method of claim 9, further comprising subjecting the oxidized cellulosic pulp to at least one carboxylation step comprising a combination of sodium chlorite and hydrogen peroxide or a combination of chlorine dioxide and hydrogen peroxide, wherein the carboxylation step takes place after the at least one oxidation step and before the at least one reduction step.

17. The method of claim 9, further comprising subjecting the open chain modified cellulosic pulp to at least one carboxylation step comprising a combination of sodium chlorite and hydrogen peroxide or a combination of chlorine dioxide and hydrogen peroxide, wherein the at least one carboxylation step takes place after the reduction step and before subjecting the open chain modified cellulosic pulp to the chemical reaction.

* * * * *